(12) United States Patent
Tsai et al.

(10) Patent No.: US 7,357,535 B2
(45) Date of Patent: Apr. 15, 2008

(54) SUPPORTING STRUCTURE OF STRAIGHT DOWN BACK LIGHT MODULE

(75) Inventors: Shen-Yin Tsai, Jen Te Hsiang (TW); Hung-Wen Yu, Jen Te Hsiang (TW); Pao-Yuan Hsu, Jen Te Hsiang (TW); Ming-Hung Hung, Jen Te Hsiang (TW); Chien-Chang Hsieh, Jen Te Hsiang (TW)

(73) Assignee: Chi Lin Technology Co. Ltd, Tainan County (TW)

( * ) Notice: Subject to any disclaimer, the term of this patent is extended or adjusted under 35 U.S.C. 154(b) by 74 days.

(21) Appl. No.: 10/892,177

(22) Filed: Jul. 16, 2004

(65) Prior Publication Data

US 2005/0270803 A1 Dec. 8, 2005

(30) Foreign Application Priority Data

Jun. 8, 2004 (TW) ................................ 93116487 A

(51) Int. Cl.
*F21V 21/00* (2006.01)
(52) U.S. Cl. ...................... 362/296; 362/257; 362/225; 362/382
(58) Field of Classification Search .............. 362/558, 362/560–561, 581–582, 609, 623, 632–634, 362/511, 329–330, 225, 97, 306, 257, 296, 362/382; 349/58–60
See application file for complete search history.

(56) References Cited

U.S. PATENT DOCUMENTS 4,418,378 A * 11/1983 Johnson ...................... 362/97
6,783,256 B2 * 8/2004 Moon ......................... 362/241
6,824,287 B2 * 11/2004 Moon ........................... 362/84
6,902,300 B2 * 6/2005 Lee ............................. 362/306
6,974,221 B2 * 12/2005 Wu et al. ..................... 362/29
7,101,074 B2 * 9/2006 Kuo et al. .................. 362/634
2002/0044437 A1 * 4/2002 Lee ............................. 362/31
2004/0012763 A1 * 1/2004 Yu et al. ..................... 353/122
2004/0156185 A1 * 8/2004 Wu ............................. 362/31
2004/0228111 A1 * 11/2004 Kuo et al. .................... 362/31
2004/0257792 A1 * 12/2004 Yu et al. ...................... 362/31
2005/0195619 A1 * 9/2005 Tseng ......................... 362/561

FOREIGN PATENT DOCUMENTS

| JP | 05-119703 | 5/1993 |
| TW | 567291 | 7/1991 |
| WO | WO-03/100317 A1 | 12/2003 |

\* cited by examiner

*Primary Examiner*—Jong-Suk (James) Lee
*Assistant Examiner*—Robert May
(74) *Attorney, Agent, or Firm*—Birch, Stewart, Kolasch & Birch, LLP

(57) ABSTRACT

A straight down back light module including a diffuser plate, a lamp, a reflector plate (back plate) and a support. The reflector plate is located below the diffuser plate. The lamp is located between the diffuser plate and the reflector plate. The support is installed between the diffuser plate and the reflector plate. The support includes a lamp cover for supporting the lamp. The lamp is directly covered by the lamp cover for preventing the lamp from deformation that could occur because of temperature difference. When used in a large-sized liquid crystal display, at least one pin can be provided on the support in order to support the diffuser plate and the lamp so as to prevent them from deformation that could occur because of temperature difference.

11 Claims, 5 Drawing Sheets

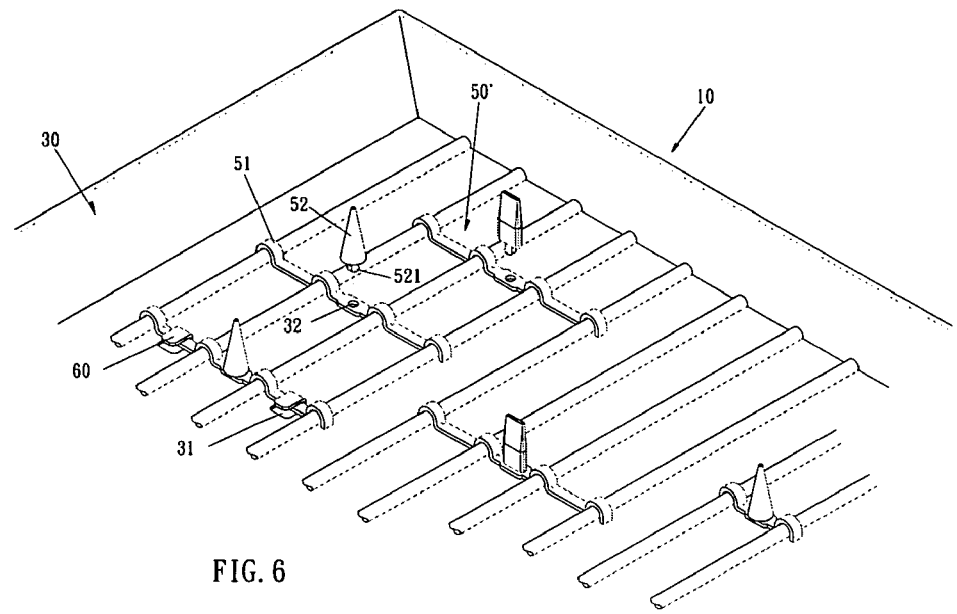
FIG. 6
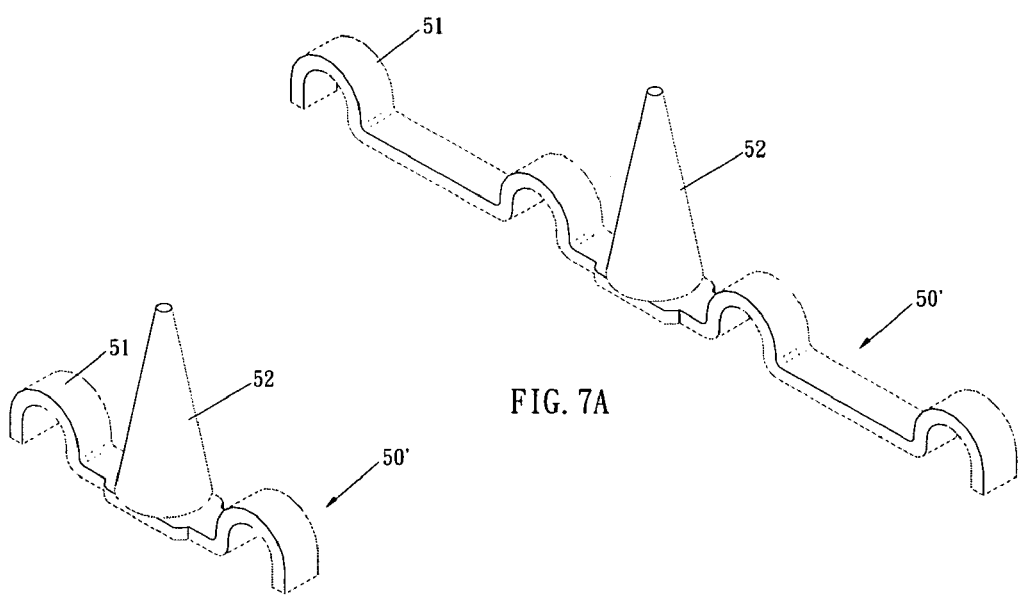
FIG. 7A
FIG. 7B

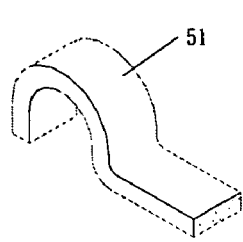
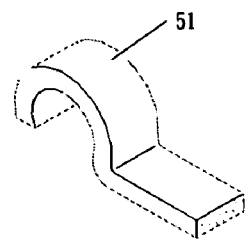
FIG. 8A            FIG. 8B
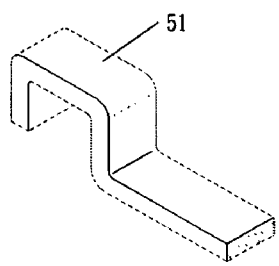
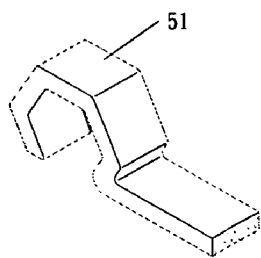
FIG. 8C            FIG. 8D
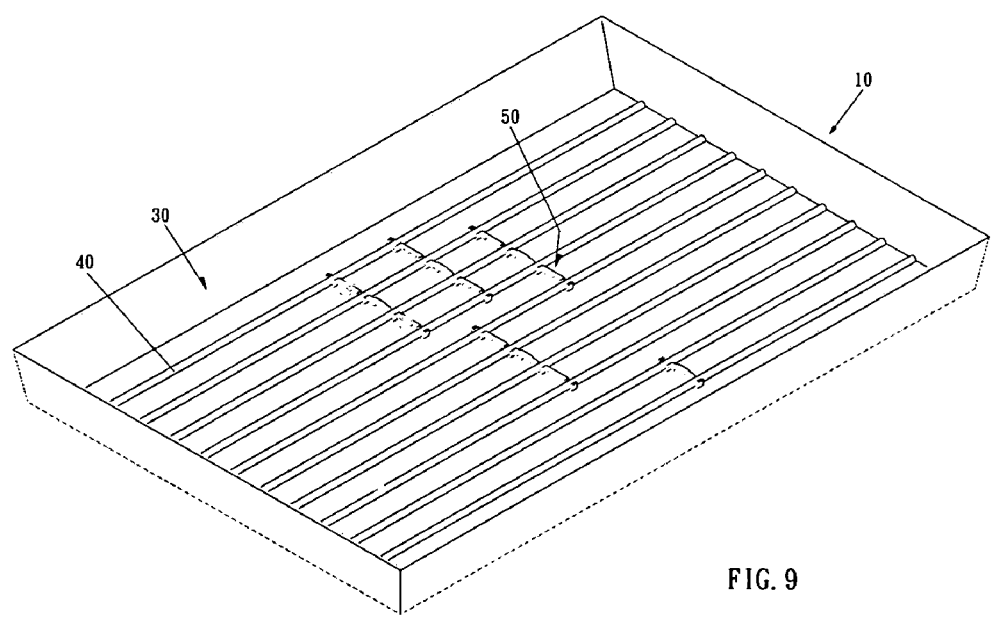
FIG. 9

SUPPORTING STRUCTURE OF STRAIGHT DOWN BACK LIGHT MODULE

This non-provisional application claims priority under 35 U.S.C. §119(a) on patent application Ser. No. 093116487 filed in Taiwan, R.O.C. on Jun. 8, 2004.

BACKGROUND OF INVENTION

1. Field of the Invention

The present invention relates to a supporting structure of a straight down back light module and, more particularly, to a supporting structure of supporting a diffuser plate and a lamp in order to prevent them from deformation that could occur because of temperature difference and inadequate rigidity of materials.

2. Description of the Related Art

FIG. 1 shows a first conventional straight down back light module (Taiwanese Patent Publication No. 567291) including a diffuser plate, a reflector plate, a prism, a diffuser strip, two supporting pillars and a plurality of lamps. The reflector plate is located below the diffuser plate. The prism is located above the diffuser plate. The diffuser plate is located on the prism. The supporting pillars are located on the reflector plate and between the diffuser plate and the reflector plate. The lamps are also located between the diffuser plate and the reflector plate.

Referring to FIG. 1, to support the diffuser plate in the first conventional straight down back light module, several supports are often provided between the reflector plate and the diffuser plate in order to prevent deterioration in optical properties of the straight down back light module that could occur because of deformation of the diffuser plate. However, as the size of the LCD is bigger, the lamp is bigger and longer. Hence, the lamp is deformed so as to affect the optical properties of the whole straight down back light module.

FIG. 2 shows a second conventional straight down back light module (Japanese Patent No. 05-119703) for solving the problems encountered in the first conventional straight down back light module.

The second straight down back light module includes a supporting pillar provided below the lamp. However, as the size of the LCD is bigger, the diffuser plate is bigger. Hence, the diffuser plate is deformed because of heat provided by means of the lamp so as to affect the optical properties of the whole straight down back light module.

SUMMARY OF INVENTION

In view of the above-mentioned problems, the primary objective of the present invention is intended to provide a straight down back light module for supporting a diffuser plate and a lamp, thus preventing them from deformation.

Thus, even the size of the LCD and the diffuser plate are increased, the diffuser plate and the lamp will not be deformed because of their own poor rigidity. When the LCD is used for a long time the diffuser plate and the reflector plate will not be deformed because of thermal expansion. Therefore, the properties of the entire straight down back light module will not be affected.

The present invention includes the following features in order to solve the above-mentioned problems. The present invention includes a diffuser plate, a conventional reflector device located below the diffuser plate, a lamp located between the diffuser plate and the reflector plate, and a support which is in the shape of a flat strip and is located between ends of the lamp and on the reflector plate and between the diffuser plate and the reflector plate. The support includes an arched lamp cover for covering the lamp so that the lamp is supported by means of the lamp cover and thus prevented from deformation.

The support can be provided with an additional pin at same time in order to support the diffuser plate and the lamp.

BRIEF DESCRIPTION OF DRAWINGS

FIG. 6 shows different supports installed on a reflector of the straight down back light module shown h FIGS. 3A and 3B.

FIGS. 7A and 7B respectively show a plurality of lamp covers or a singular lamp cover included in the support of the straight down back light module shown in FIGS. 3A and 3B.

FIGS. 8A, 8B, 8C and 8D respectively show the lamp covers included in the support of the straight down back light module shown in FIGS. 3A and 3B to be U-shaped, circular, rectangular or polygonal.

FIG. 9 shows a support to support a lamp.

DETAILED DESCRIPTION OF THE PREFERRED EMBODIMENTS

Two different kinds of embodiment are described below:

First Embodiment Applying in Small Size LCD

Figure 1:
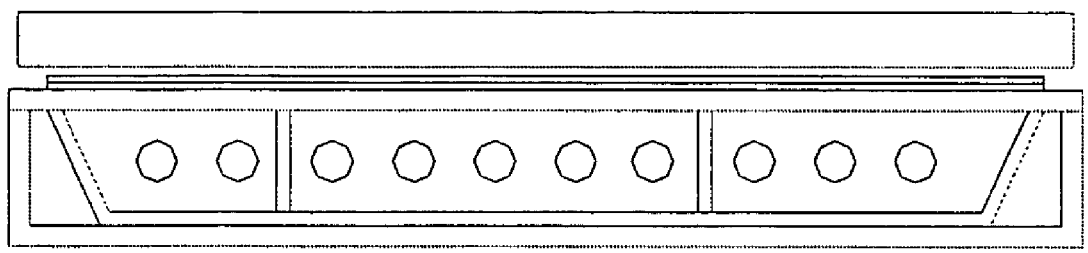
FIG. 1 is a cross-sectional view of a first conventional straight down back light module.
Figure 2:
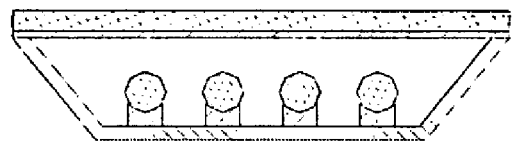
FIG. 2 is a cross-sectional view of a second conventional straight down back light module.
Figure 3A:
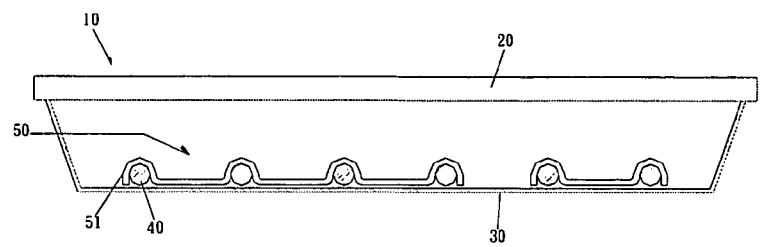
FIGS. 3A and 3B are cross-sectional views of a straight down back light module according to the preferred embodiment of the present invention.
Figure 4A:
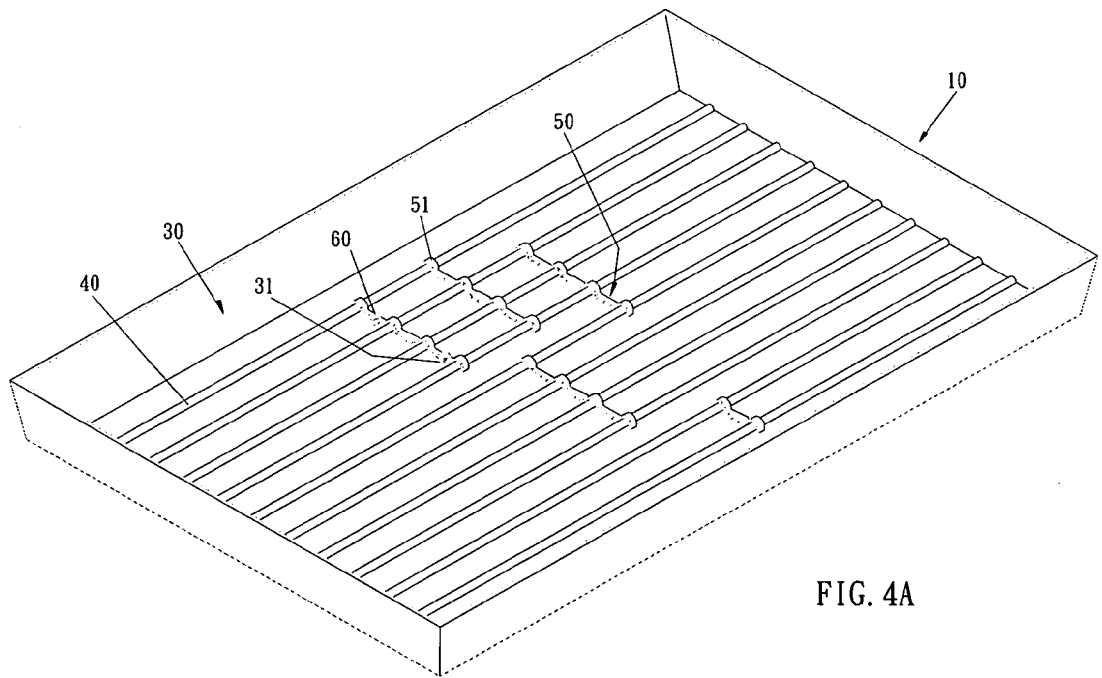
FIGS. 4A and 4B show how supports are installed in the straight down back light module shown in FIGS. 3A and 3B.

As shown in FIGS. 3A and 4A, according to the present invention, a straight down back light module 10 includes a diffuser plate 20, a reflector plate 30, a lamp 40, and a support 50. The support 50 is made from a flat strip which is bent to form U shape sections, each of which include a lamp cover 51.

The reflector plate 30 is located under the diffuser plate 20 and the lamp 40. The lamp 40 is located between the diffuser plate 20 and the reflector plate 30. The support 50 is located on the reflector plate 30 and between the diffuser plate 20 and the reflector plate 30.

As shown in FIGS. 3A and 4A, the support 50 includes a lamp cover 51. The lamp 40 is covered by means of the lamp cover 51 and thus supported.

Because the material of the support 50 is plastic and refractory and will not cause deformation of the lamp 40, the lamp 40 is generally supported by means of the support 50.

In this embodiment, the support 50 is put on the reflector plate 30 and includes a substantially wave-shaped structure. The size of the support 50 is determined by the size of the space between the diffuser plate 20 and the reflector plate 30.

In this embodiment, the lamp cover 51 of the support 50' is an inverted U-shaped upper half. The diameter of the U-shaped upper half of the support 50' is marginally larger than that of the lamp 40. The lamp 40 is covered by means of the lamp cover 51. The thermal deformation of the lamp 40 is reduced to a minimum by means of the lamp cover 51.

As shown in FIG. 4A, the support 50 is secured to the reflector plate 30 by means of gluing. Alternatively, a slot 31 is defined in the reflector plate 30, and a hook 60 is formed on a lower side of the support 50. The hook 60 can be inserted through the slot 31 in order to hook the reflector plate 30, thus supporting the lamp 40.

As the size of the liquid crystal display is increased, an additional pin 52 is provided on the support 50 so as to form a support 50

Second Embodiment

Figure 3B:
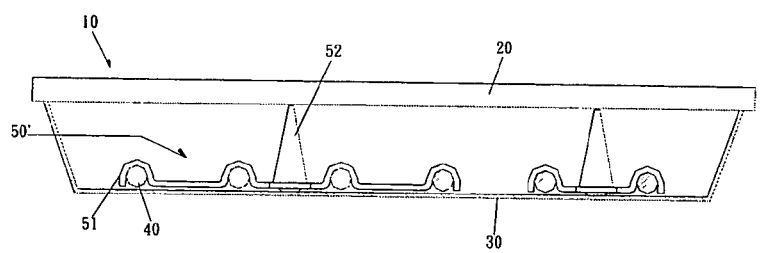
Figure 4B:
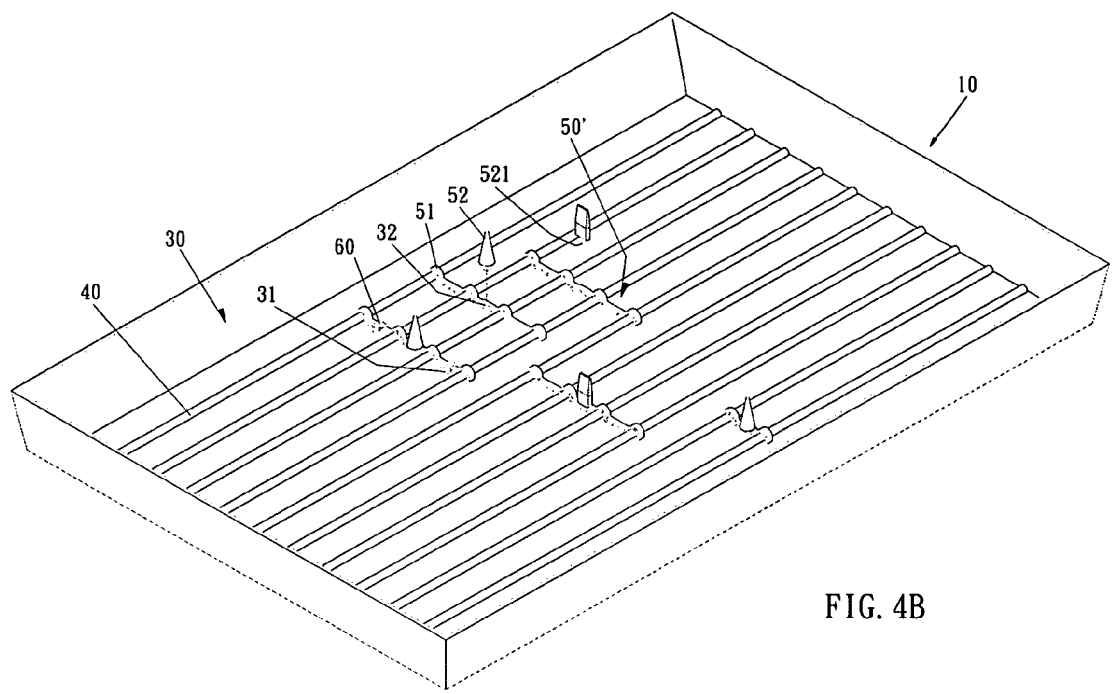
Figure 5A:
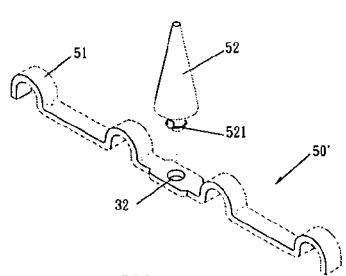
FIGS. 5A, 5B, 5C and 5D show different plungers used in the straight down back light module shown in FIGS. 3A and 3B.
Figure 5B:
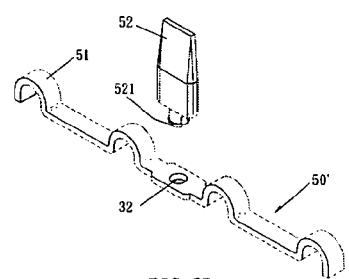
Figure 5C:
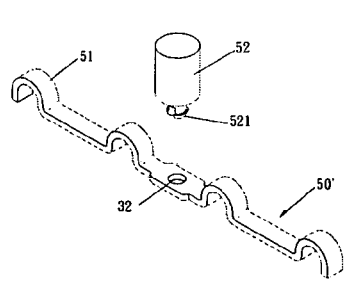
Figure 5D:
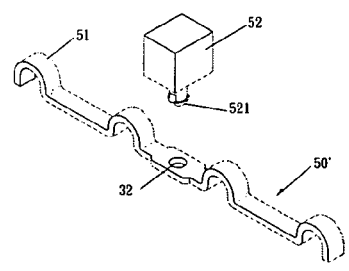

As shown in FIG. 3B and 4B, according the second embodiment, the straight down back light module 10 includes diffuser plate 20, a conventional reflector device 30, a lamp 40, and a support 50'. The support 50' includes a lamp cover 51. The support 50 includes at least one pin 52 that is not shown in the first embodiment.

The conventional reflector device 30 can be a reflector plate or a substrate on which a reflector strip is provided.

The conventional reflector device 30 is located below the diffuser plate 20 and the lamp 40. The lamp 40 is provided between the diffuser plate 20 and the reflector device 30. The support 50' is located on the reflector device and between the diffuser plate 20 and the reflector device 30.

As shown in FIGS. 3B and 4B, the support 50' is used to support the diffuser plate 20 and the lamp 40 simultaneously. The support 50' includes a lamp cover 51. The lamp 40 is covered by means of the lamp cover 51 and thus supported.

Because the material of the support 50' is plastic and refractory and will not cause deformation of the diffuser plate 20 and the lamp 40, the diffuser plate 20 and the lamp 40 are generally supported by means of the support 50'.

In this embodiment, the support 50' is put on the reflector device 30 and includes a substantially wave-shaped structure. The size of the support 50' is determined by the size of the space between the diffuser plate 20 and the reflector device 30. The size of the pin 52 of the support 50' is fitted the height between the diffuser plate 20 and the reflector device 30 to support the diffuser plate 20.

In this embodiment, the lamp cover 51 of the support 50 is an inverted U-shaped upper half. The diameter of the U-shaped upper half of the support 50 is marginally larger than that of the lamp 40. The lamp 40 is covered by means of the lamp cover 51. The thermal deformation of the lamp 40 is reduced to a minimum by means of the lamp cover 51.

As shown in FIG. 6, a slot 31 is defined in the reflector device 30, and a hook 60 is formed on a lower side of the support 50'. The hook 60 can be inserted through the slot 31 in order to hook the reflector device 30.

Alternatively, a tenon 521 is provided on a lower portion of the pin 52 of the support 50', and an aperture 32 defined in the reflector device 30. As shown in FIG. 6, the support 50' is provided on the reflector device 30, the tenon 521 is inserted through the aperture 32 in order to joint the reflector device 30. Alternatively, the support 50 can be secured to the reflector device 30 by means of gluing, The tenon 521 can be secured to the aperture 32 of the reflector device 30 by means of gluing. Alternatively, the tenon 521 can be secured to the aperture 32 of the reflector 30 by means of threads engaged with each other.

The support 50', the lamp cover 51, the pin 52 and the tenon 521 can be made in various shapes and connected with one another in various manners. The slot or aperture can be defined in the reflector device 30 corresponding to the tenon 521 formed on the support 50.

FIGS. 5A, 5B, 5C and 5D show pins in different shapes.

As shown in FIG. 6, the support 50' can be secured to the reflector device 30 in various manners such as hooking, gluing engagement of threads, and tenon-joint.

Moreover, the support 50' can include a plurality of lamp covers 51 or a singular lamp cover 51 shown in FIGS. 7A and 7B, respectively.

Furthermore, the lamp cover 51 of the support 50' may be U-shaped, circular, rectangular or polygonal shown in FIGS. 8A, 8B, 8C and 8D, respectively.

Moreover, the lamp cover simply covers the lamp in the above-mentioned embodiments. However,the lamp cover can clamp the lamp as shown in FIG. 9. The manners in which the lamp cover covers the lamp are not limited in the present invention.

The material of the support can be polystyrene resin derivatives (such as HIPS, ABS, MS and SAN), polymethyl methacrylate ("PMMA"), polycarbonate ("PC"), epoxy, silicone, olefin resin (such as PE and PP) or polyamide resin (such as Nylon), and polymer resin (such as PET).

The present invention has been described via detailed illustration of some embodiments. Those skilled in the art can derive variations from the embodiments without departing from the scope of the present invention. Therefore, the embodiments shall not limit the scope of the present invention defined in the claims.

What is claimed is:

1. A straight down back light module comprising:
a diffuser plate;
a reflector device located below said diffuser plate;
a lamp located between said diffuser plate and said reflector device; and
a support located between ends of said lamp comprising a plurality of lamp covers located on said reflector device and between said diffuser plate and said reflector device for supporting said lamp, at least one of said plurality of lamp covers located at a light emitting area of the lamp, and said lamp cover having an inverted U shape having a cross-sectional area being marginally larger than that of the lamp so as substantially cover and be fixed to the lamp; and
at least one pin located on the support and between two lamp covers for supporting said diffuser plate.

2. A straight down back light module according to claim 1, wherein said reflector device comprises a substrate and a reflector strip provided on said substrate.

3. A straight down back light module according to claim 1, wherein said support comprises a wave-shaped configuration.

4. A straight down back light module according to claim 1, wherein said support is made of plastic.

5. A straight down back light module according to claim 4, wherein said plastic is chosen from the group consisting of polystyrene resin derivatives, polymethyl methacrylate, polycarbonate, epoxy, silicone, olefin resin, polyamide resin and polymer resin.

6. A straight down backlight module according to claim 1, wherein each lamp cover has a first part in an inverted U shape with a diameter marginally larger than the diameter of the lamp and a second planar part in contact with said reflector device.

7. A straight down backlight module according to claim 1, wherein said inverted U shape has at least one end part in contact with said reflecting device.

8. A straight down backlight module according to claim 1, wherein said reflecting device is reflecting plate.

9. A straight down backlight module according to claim 1, wherein said support is in the form of a flat strip.

10. A straight down backlight module according to claim 9, wherein said flat strip is bent to form said inverted U shape.

11. A straight down backlight module according to claim 1, wherein said support extends transversely between a plurality of lamps.

* * * * *